United States Patent
Hussaini

(10) Patent No.: US 6,425,640 B1
(45) Date of Patent: Jul. 30, 2002

(54) WHEEL COVER WITH IMPROVED RETENTION SYSTEM

(75) Inventor: Saied Hussaini, Miami, FL (US)

(73) Assignee: Rally Manufacturing, Inc., Miami, FL (US)

( * ) Notice: Subject to any disclaimer, the term of this patent is extended or adjusted under 35 U.S.C. 154(b) by 0 days.

(21) Appl. No.: 09/699,345

(22) Filed: Oct. 31, 2000

(51) Int. Cl.$^7$ .................................................. B60B 7/12
(52) U.S. Cl. .................................. 301/37.33; 301/37.42
(58) Field of Search ........................... 301/37.33, 37.32, 301/37.31, 37.102, 37.101, 37.42

(56) References Cited

U.S. PATENT DOCUMENTS

| | | | | |
|---|---|---|---|---|
| 4,458,952 A | * | 7/1984 | Foster et al. ............. | 301/37.33 |
| 4,709,967 A | * | 12/1987 | Sakamoto ................ | 301/37.33 |
| 4,822,109 A | * | 4/1989 | Feria ...................... | 301/37.32 |
| 5,161,860 A | * | 11/1992 | Sakane .................... | 301/37.32 |
| 5,700,062 A | * | 12/1997 | Wang ...................... | 301/37.33 |
| 5,895,166 A | * | 4/1999 | Tsai ........................ | 301/37.32 |
| 6,099,082 A | * | 8/2000 | Wang ...................... | 301/37.33 |
| 6,139,114 A | * | 10/2000 | Wang ...................... | 301/37.33 |

* cited by examiner

*Primary Examiner*—S. Joseph Morano
*Assistant Examiner*—Long Bao Nguyen
(74) *Attorney, Agent, or Firm*—Liniak, Berenato, Longacre & White

(57) ABSTRACT

The degree of tightness, which a wheel is attached to the wheel of an automobile, may be varied by selectively engaging the ends of a retention ring in a specially formed retention tab ring supporter. The retention ring is supported on a plurality of circumferentially spaced ring supports provided on the wheel cover, and the ends of the ring are retained by the retention tab ring supporter. The retention tab is provided with an opening to receive a blunt end of the retaining ring and two adjacent vertical slots for receiving a finger end of the retaining ring. Selection of either of the two vertical slots for receiving the finger end varies the practical diameter of the retention ring when engaged with the ring supporters thereby providing and adjustment in tightness between the wheel cover and the wheel.

7 Claims, 3 Drawing Sheets

WHEEL COVER WITH IMPROVED RETENTION SYSTEM

BACKGROUND OF THE INVENTION

1. Field of the Invention

This invention relates to an automobile wheel cover, and particularly to one that is easy to safely adjust the tightness of the wheel cover body and quickly fixing the wheel cover on a wheel.

2. Description of Related Art

A wheel cover is used for an adornment covering on the wheel rim, and a wheel cover 10 is shown in FIG. 1 of which the present invention improves upon and is applied to. The wheel cover 10 comprises a wheel cover body 12 and six or eight or ten identical ring supporters or hook arms 14. The hook arms 14 each have a hook portion 16 for catching and holding a metal retention ring 20, which serves for urging the hook arms 14 outwardly. A tightening force is created between the retention ring 20 and the hook arms 14 to press the hooks arms against the inner circumferential edge of a wheel rim (not shown), as will be understood by those familiar with wheel cover retainers. A conventional retention ring 20, shown in FIG. 2, is made of a slender round wire or bar having both ends welded together so that it has definite diameter virtually impossible to vary. Thus a functional diameter A, illustrated in FIG. 2, is formed by the outer edges 21 of the hook arms 14. Conventionally this functional diameter is fixed or not adjustable when the retention ring 20 is engaged with the hooks.

When a wheel cover rotates at a high rate of speed together with a wheel, the interconnecting tightness between the hook arms and the inner circumferential edge of the wheel is extremely important. If the mutual tightness is not proper, the wheel cover may accidentally fall off and wound a person walking on the street during driving of a car. In fact, wheel rims and wheel covers commonly have some gap between them before they are combined together. This is why the wheel cover body is provided with ring supporters and a retention ring for expanding out the ring supporters so that a wheel cover body may be positioned tightly on a wheel rim. Ideally however, a wheel cover should provide a tightness adjusting structure formed by the ring supporters and the ring.

When the inner circumferential edge of a wheel has a diameter a little different from the definite functional diameter A defined by the hook arms 14 and ring 20 being engaged, the wheel cover 10 may not be fixed with the wheel in a secured condition. Though a wheel rim theoretically has a certain inner diameter, it is inevitable that some error may result in the manufacturing process. When the inner circumferential edge of the wheel has a slightly larger diameter than the functional diameter A of the wheel cover 10, the attachment of the wheel cover may be loose and unstable. On the contrary, when the inner circumferential edge of the wheel has a smaller diameter than the functional diameter A of the wheel cover 10, the wheel cover 10 may be difficult to fix to a wheel or cannot be fixed thereto without hammer. These problems occur due to slight errors between the inner diameter the wheel rim and a fixed, nonadjustable diameter of the wheel cover retention ring.

This invention aims to furnish a wheel cover retention ring system of which the functional diameter of the wheel cover is adjustable between two or more (multiple adjusting holes) different measurements so as to cope with the diametrical error a wheel may have.

SUMMARY OF THE INVENTION

This invention provides an automobile wheel cover having an easily and safely adjustable structure. The automobile wheel cover includes a wheel cover body, a plurality of ring supporters fixed to and spaced apart around an outer peripheral edge of the wheel cover body, and a retention ring detachably engaged on the ring supporters. The retention ring has free ends, and a retention tab comprising one of the plurality of ring supporters is especially formed for retaining the free ends of the retention ring. The ring supporters comprise a hook like portion and a lengthwise groove adjacent the hook like portion for a portion of the retention ring to be supported in. A tab like portion is provided adjacent the groove for maintaining the portion of the retention ring within the groove.

The retention tab provides a system for selectively varying a practical diameter of the retention ring when engaged with the ring supporters, to provide an adjustment of tightness between the wheel cover and a wheel diameter. The retention ring comprises a slender round bar formed into a circle, a first free end of the ring being blunt and a second free end of the ring having a bend to form a finger. The retention tab has a first side having a slotted opening for receiving the blunt end of the ring and a stop for the blunt end to bear against. The retention tab has a second side having at least two adjacent finger slots for selective engagement with the finger end of the ring. The finger slots are arranged for receiving and securing the finger end of the ring the bend. The slotted opening and the finger slots are arranged at approximately a right angle with respect to one another. The second side of the retention tab further comprises a retaining tab and a groove supporting a portion of the second end of the ring before the bend and finger, and retaining the finger portion within a selected finger slot.

BRIEF DESCRIPTION OF THE DRAWINGS

This invention will be better understood by reference to the accompanying drawings, wherein.

DETAILED DESCRIPTION OF THE PREFERRED EMBODIMENT

Figure 1:
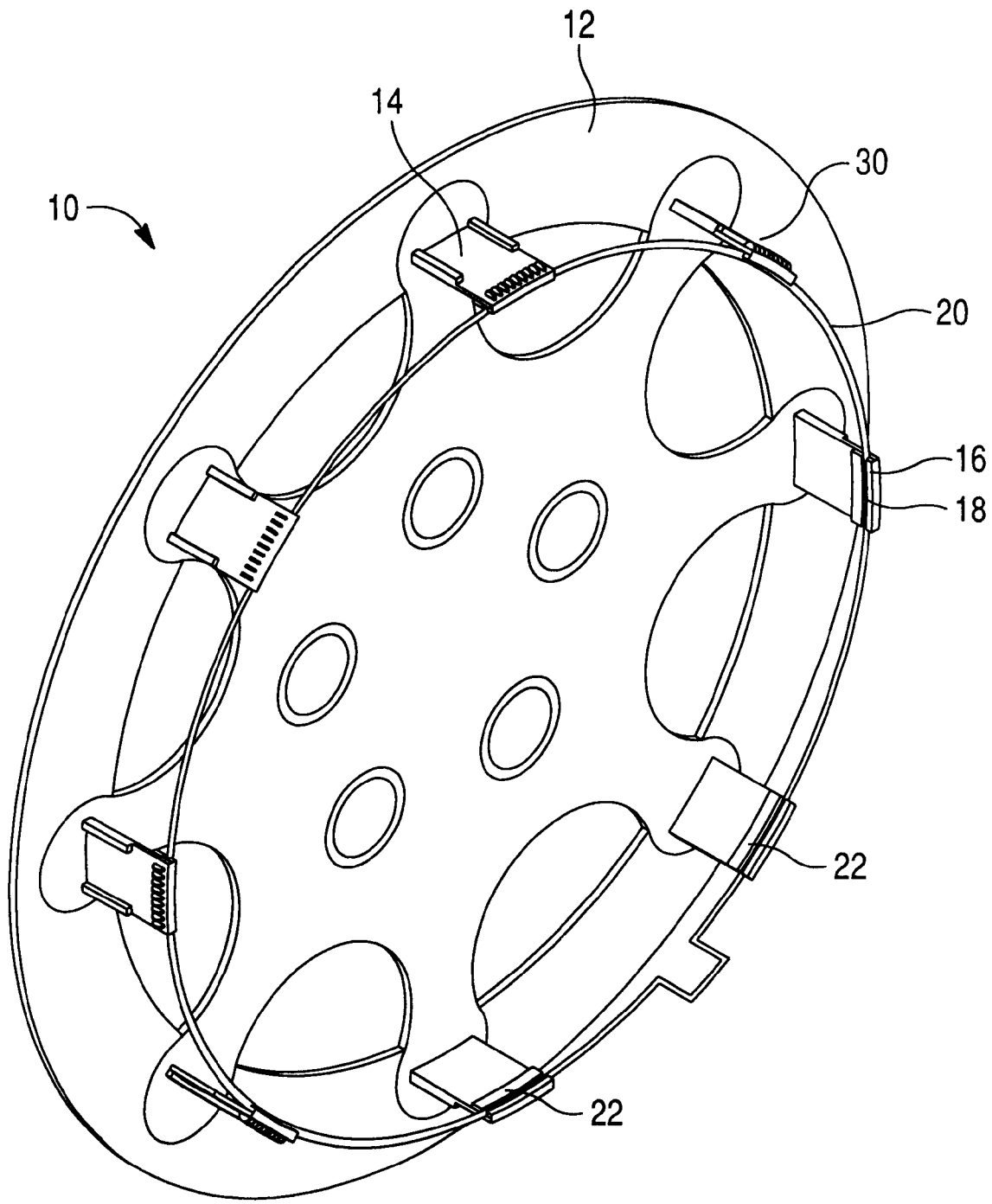
FIG. 1 is a perspective view of a wheel cover to which the present invention is applied.
Figure 2:
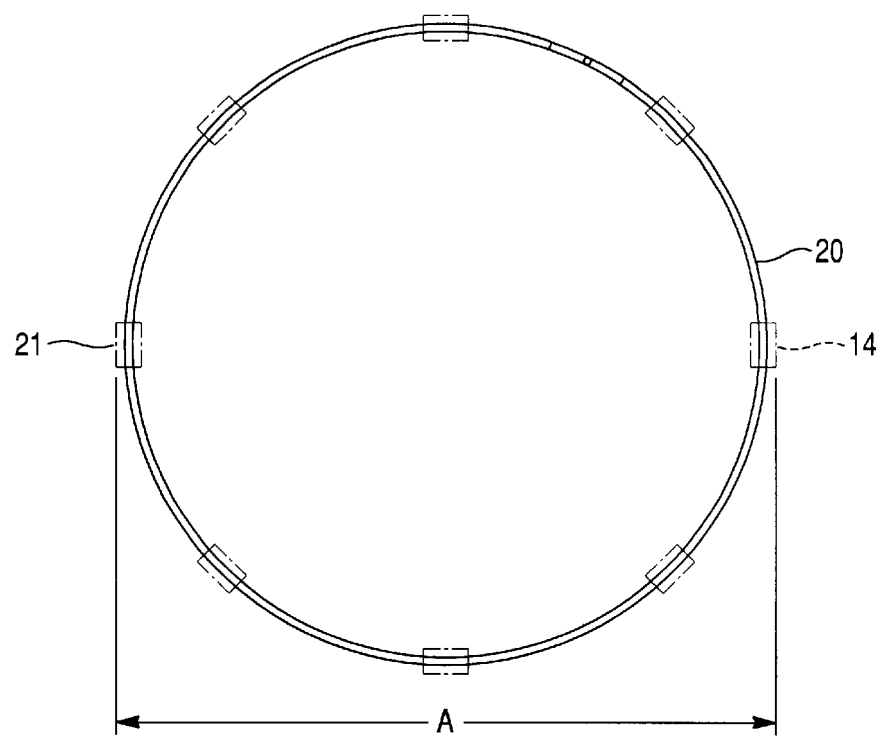
FIG. 2 shows an elevational view of a retention ring used in a conventional wheel cover.
Figure 3:
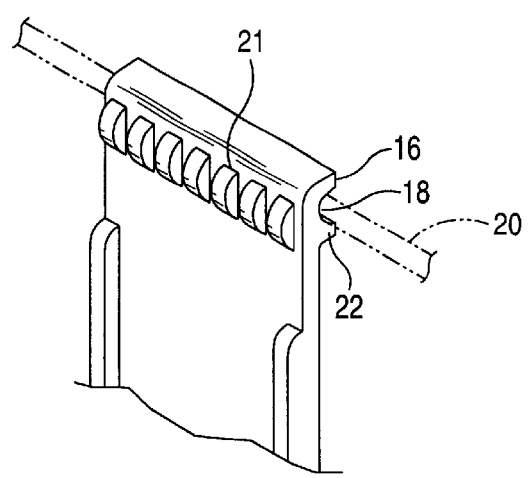
FIG. 3 shows a perspective outer view of a ring supporter used with the present invention.

A preferred embodiment of an automobile wheel cover according to the present will now be described with reference again to FIG. 1. The wheel cover 10 includes a wheel cover body 12, a plurality of ring supporters 14 fixed on and spaced around an outer spherical edge of the wheel cover body 12, and a steel retention ring 20 fitted on the ring supporters 14. As can best be seen in FIG. 3, the ring supporters 14 are each provided with a hook like portion 16 and a horizontal groove 18 for the ring 20 to fit therein so as to keep the ring 20 from loosening off. Also a horizontal tab 22 extends adjacent to the groove 18 to facilitate retention of the ring 20 between the hook 16 and the groove 18. It should be noted that in describing the orientation of the groove and the tab, that horizontal is intended to be with respect to the plane formed by the retaining ring as is it supported and fitted onto the ring supporters. The tab 22 may extend the entire length along the underside of the groove 18, or preferably, the tab 22 is shortened as best viewed in FIG. 1, to facilitate installation and removal of the retaining ring from the ring supporters.

Figure 4:
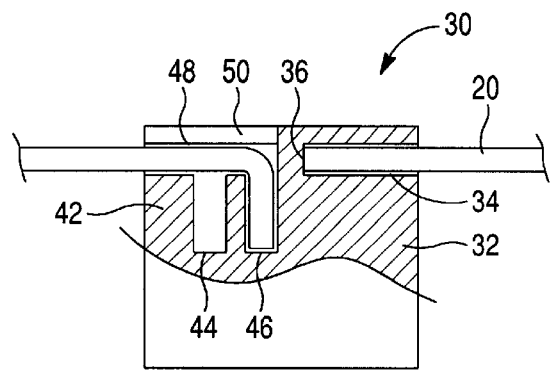
FIG. 4 shows a sectional inner view of the retention tab according to the invention wherein the two ends of the retention ring are joined to define a smaller diametrical dimension of two possible different measurements for the wheel cover.
Figure 5:
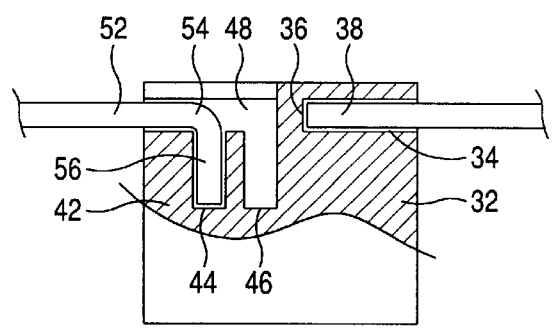
FIG. 5 shows a sectional inner view of the retention tab according to the invention, wherein the two ends of the retention ring are joined to define a larger diametrical dimension of two possible different measurements for the wheel cover.
Figure 6:
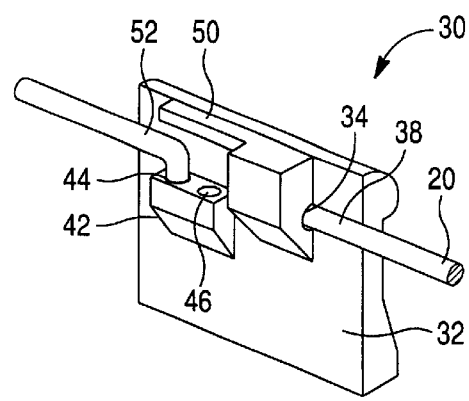
FIG. 6 is an inner perspective view of the retention tab according to the invention wherein the two ends of the retaining ring are joined.

One of the ring supporters 14 is especially formed as a retention tab 30 for retaining the ends of the ring 20, which has free ends as will be described hereinafter. A first side 32 of the retention tab 30 is provided with an opening 34 and a side stop 36 to receive a blunt end 38 of the retaining ring. A second side 42 of the retention tab 30 is provided with two adjacent vertical slots 44, 46 respectively, a position groove 48, and a retaining tab 50 both formed above the adjacent slots 44, 46, as shown in FIGS. 4, 5, and 6. It can be seen that according to the invention the retention ring 20 is made of a slender round bar having both ends free. A first end 38 of the ring is a blunt end which is received in the retaining tab 30 within the opening 34 and may bear against the side stop 36. A second end 52 of the ring 20 has a bend 54 which forms a finger portion 56 which is to be received in one of the vertical slots 44, 46 and retained therein. The ring is flexible and capable of overlapping ends when free, and has a diameter smaller than the practical diameter of the ring when it is combined with the wheel cover and wheel rim.

Upon installation, the first end 38 of the retaining ring 20 is fitted in the opening 34 and the second end 52 having the retaining finger 56 is fitted into either one of the vertical slots 44, 46 and guided by the positioning groove 48. The retaining tab 50 retains the finger within the selected slot. When the finger 56 is placed in the inner slot 46 the diameter of the ring 20 becomes slightly smaller and the outward expansion force of the ring 20 is comparatively small. Provision of the two vertical slots 44, 46 on the retention tab ring supporter 30 allows for adjustability of the expanding force of the ring 20 and the ring supporters 14 fixed with the wheel cover body 12. If the wheel cover 10 is to be adjusted tighter, the first end 38 of the wheel ring 20 is kept in the opening 34 and is maintained in position by the side stop 36. Then the finger end 56 of the retention ring 20 is pulled out from the inner slot 46 and fitted in the outer slot 44. This results in the diameter of the retention ring becoming larger than that of the retention ring when fitted in the inner slot 46, so that the outward expansion force of the retention ring 20 may become larger. Thus, the expanding force of the all the ring supporters 10 of the wheel cover body 12 may be adjusted.

As described above, the function of adjusting the tightness of the wheel cover body 12 is effected by fitting one end of the retention ring 20 in the opening 34 in the retention tab 30, and the other end 52 of the retention ring 20 having a finger 56, in the inner or outer vertical slots 44, 46, respectively. In adjusting the tightness of the wheel cover body 12, the retention ring 20 may be pulled out of the grooves 18 of all ring supporters 14, or the finger end 52 of the retention ring may be pulled out from the retention tab 30 relatively easily. Once the inner or outer vertical slot has been selected, the remaining portion of the retention ring is fitted again in the grooves 18 of all the ring supporters. It should be noted that the number of vertical slots in the retaining tab ring supporter 30 need not be limited to two, since it is possible to utilize more than two slots to provide even greater adjustability.

By having the two ends 38, 52 of the retention ring joined together with the retention tab 30 according to the invention, the ring 20 has differing functional diameters depending on whether the finger end is fully inserted into the inner slot or into the outer slot. The arrangement of these two different diametrical measurements of the retaining ring 20 enables slight radial adjustment among the hook arms 14 to match a wheel, which inevitably has a slight diametrical error. This enables a proper interconnecting tightness, not too tight or loose, to be achieved between the hook arms and the wheel.

In general, the diametrical error of a wheel is very small. It must be emphasized that said small diametrical error may cause in-secure interconnection between the wheel and the wheel cover. To settle the above, only a small differentiation in location between the two vertical slots is necessary for the achievement of a safe, smooth installation of the wheel cover to a wheel.

While the preferred embodiment of the invention has been described above, it will be recognized and understood that various modifications may be made thereto and the appended claims are intended to cover all such modifications which may fall within the spirit and scope of the invention.

What is claimed is:

1. An automobile wheel cover including a wheel cover body, a plurality of ring supporters fixed to and spaced apart around an outer peripheral edge of said wheel cover body, a retention ring detachably engaged on said ring supporters, said retention ring having free ends, and a retention tab comprising one of said plurality of ring supporters especially formed for retaining the free ends of said retention ring, wherein said retention ring comprises a slender round bar formed into a circle, a first free end of said ring being blunt and a second free end of said ring having a bend to form a finger.

2. The wheel cover according to claim 1 wherein said retention tab has means for selectively varying a practical diameter of said retention ring when engaged with said ring supporters to provide an adjustment of tightness between the wheel cover and a wheel diameter.

3. The wheel cover according to claim 2, wherein said plurality of ring supporters comprise a hook like portion and a lengthwise groove adjacent the hook like portion for a portion of the retention ring to be supported in, and further comprise a tab like portion adjacent the groove for maintaining the portion of the retention ring within the groove.

4. The wheel cover according to claim 1, wherein the retention tab comprises a first side having a slotted opening for receiving the blunt end of the ring and a stop for the blunt end to bear against, and a second side having at least two adjacent finger slots for selective engagement with the finger end of the ring, said finger slots arranged for receiving and securing the finger end of the ring the bend.

5. The wheel cover according to claim 4, wherein said slotted opening and said finger slots are arranged at approximately a right angle with respect to one another.

6. The wheel cover according to claim 4, wherein said second side of the retention tab further comprises a retaining tab and a groove supporting a portion of the second end of the ring before the bend and finger, and retaining the finger portion within a selected finger slot.

7. The wheel cover according to claim 4, wherein said plurality of ring supporters comprise a hook like portion and a lengthwise groove adjacent the hook like portion for a portion of the retention ring to be supported in, and a tab like portion adjacent the groove which maintains the portion of the retention ring within the groove.

\* \* \* \* \*